Sept. 26, 1944.　　　W. C. TRAUTMAN　　　2,358,950
VALVE
Filed Nov. 4, 1941　　　2 Sheets-Sheet 1

INVENTOR
WALTER C. TRAUTMAN
BY
H. W. Brelsford
ATTORNEY

Sept. 26, 1944.    W. C. TRAUTMAN    2,358,950
VALVE
Filed Nov. 4, 1941    2 Sheets-Sheet 2

*INVENTOR*
WALTER C. TRAUTMAN
BY  H. W. Brelsford
*ATTORNEY*

Patented Sept. 26, 1944

2,358,950

UNITED STATES PATENT OFFICE 2,358,950

VALVE

Walter Carl Trautman, North Hollywood, Calif., assignor, by mesne assignments, to Bendix Aviation Corporation, South Bend, Ind., a corporation of Delaware Application November 4, 1941, Serial No. 417,815

1 Claim. (Cl. 251—27)

This invention relates to valves and more particularly to a combination of valve seats and plastic poppet valve elements. This application constitutes a continuation in part of my application Serial No. 389,052 filed April 17, 1941.

Poppet valves have long been used in the valve art because of their simplicity of design and ease of control. Ordinarily a metal poppet is seated on a metal valve seat and various means employed to obtain the closest possible contact between the two. The two valve elements are first closely machined and then lapped into position. This type of production technique is costly and slow and requires individual fits between each poppet and its seat. Thus present production operations necessary to produce high quality poppet valves, such as are necessary in aircraft work, are unit operations incapable of application to the mass production of valves.

One attempt to secure a perfect seal between poppet and seat is to use a metal seat formed at an angle to the mating poppet. The object in so doing is to form a hair line contact and to secure a wedging action to obtain more seating pressure. With present day machine tools it is not commercially possible to obtain perfectly round holes and correspondingly perfectly round poppets, and the hair line contact is not achieved. The valve elements must be lapped to get a more perfect contact, but as soon as they are lapped, a seat is formed and the contact is no longer a hair line contact.

I have discovered that a perfect seal may be obtained by using a poppet of soft material such as Bakelite in combination with a valve seat of harder material such as metal. The seal is obtained by making the valve seat and the poppet at different angles, or more correctly, at differential angles. Although the angle of the poppet may be greater than the seat angle, I prefer to use a valve wherein the angle of the poppet is less than the angle of the seat. The first contact of these elements will be a hair line contact, but as the valve is used in service, the relatively softer poppet is worn away by the valve seat, and the poppet then has a contact surface with the valve seat which is identical with the shape of the valve seat. The contact thus achieved between valve seat and poppet is as perfect as that obtained by careful lapping and may truly be called perfect from a practical standpoint. This perfection in result is obtained at a fraction of the cost of the lapped construction.

It is therefore an object of my invention to provide an inexpensive poppet construction giving as good results as the most perfect, carefully machined and lapped metal poppets.

Another object is to provide a poppet valve that is inherently self-seating.

A more specific object is to provide a poppet valve construction in which the poppet wears rapidly and smoothly to seat itself during initial operation of the valve and thereafter wears relatively slowly so that it has a long life in service.

Other more specific objects and features of the invention will become apparent from the detailed description to follow.

The invention will be described with reference to the accompanying drawings in which.

Figure 1:
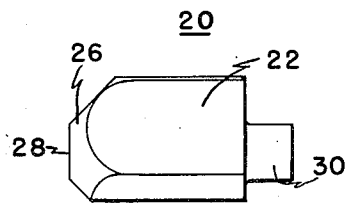
Figure 1 is a view in elevation of a plastic poppet made in accordance with the invention.
Figure 2:
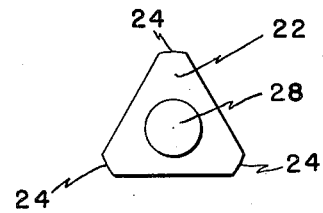
Figure 2 is a view of the left end of the poppet of Figure 1.

A poppet for use with the invention is shown in Figures 1 and 2. The poppet as a whole is referred to by the numeral 20, and includes body member 22 of a generally prismatic cross-section but having rounded corners 24 as shown in Figure 2. The left end of the prism is tapered at 26 forming a nose 28. A short stem 30 is formed on the other end to act as a spring guide for any spring which might be used in connection with the poppet.

Figure 3:
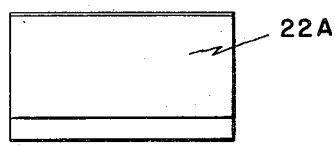
Figure 3 is a view in elevation of a molded length of plastic of prismatic cross section from which the poppet of Figure 1 is formed.
Figure 4:
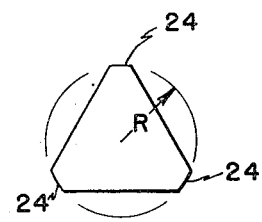
Figure 4 is an end view of the plastic length of Figure 3.

The poppet 20 is preferably formed from a moulded prismatic block 22A as shown in Figures 3 and 4. The block 22A is machined to the shape shown in Figures 1 and 2. From Figure 4 it will be noted that the rounded corners 24 form a part of a circle drawn with a radius R from the geometric center of the prism 22A. This shape allows the poppet 20 to be accurately guided in any cylindrical hole in which it is placed. Although the machining of a plastic block has been standard practice, molding the poppet to final shape is also feasible.

Figure 5:
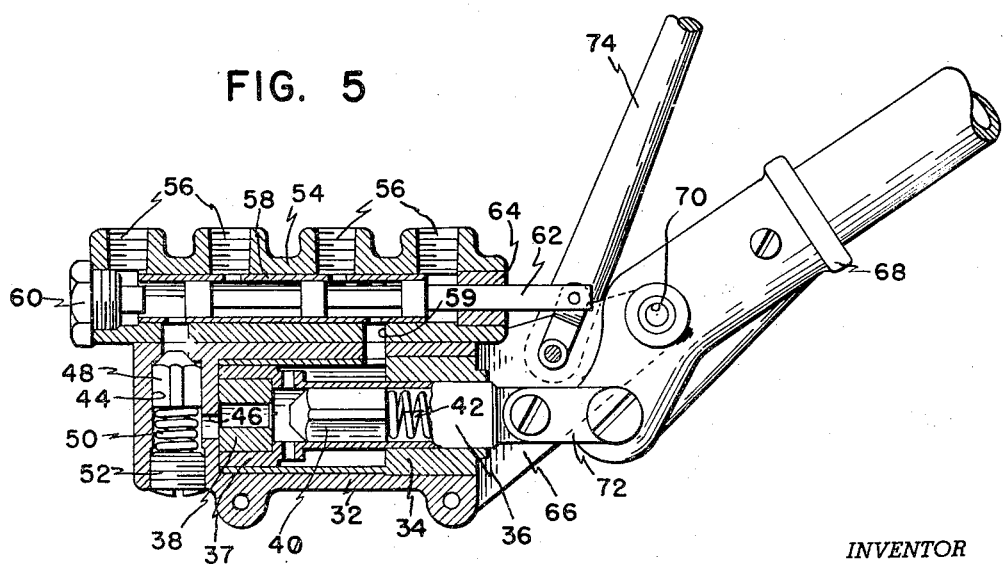
Figure 5 is a view in vertical section of a hand pump having poppet valves made in accordance with the invention.

The poppets made in accordance with the invention are shown in use in a hand pump in Figure 5. A pump housing 32 retains a central liner 34 in which is placed a hollow piston rod 36 having its left end enlarged to form a piston 37 holding valve seat ring 38. Placed within piston rod 36 is a plastic poppet 40 urged against seat ring 38 by a compression spring 42.

In the left end of housing 32 is a vertical hole 44 communicating with the interior of liner 34 by a hole 46. Placed in hole 44 is a plastic poppet 48 normally held against its seat by a compression spring 50 secured in the hole 46 by a plug 52.

Mounted on the top of housing 32 is a hollow housing 54 having four ports 56. A liner 58 is fitted within housing 54 and the hole closed on the left end by a plug 60. Placed within liner 58 is a valve rod 62 having three lands and secured at its right end by a bushing 64. A hole 59 communicates housing 54 with the interior of liner 34.

Secured to the right end of housing 32 is a bracket 66 to which is pivoted a pump handle 68 at 70. The lower end of handle 68 is connected to piston rod 36 by a link 72. A valve control lever 74 is also pivoted to bracket 66 and is in turn connected to valve rod 62. Manual operation of valve lever 74 selects one of two pairs of ports 56 for operation.

The operation of the hand pump of Figure 5 is more fully explained in application Serial Number 389,052 but is briefly as follows: The handle 68 is manually swung about its axis with a reciprocatory movement causing piston rod 36 to reciprocate. As the piston 37 moves toward the right, poppet 40 seats on insert 38 forming a solid piston. This subjects the liquid in hole 44 to suction causing poppet 48 to unseat, allowing flow of fluid through passage 48. At the same time the liquid to the right of the piston is trapped by the closing of poppet 40 and is forced upwardly through hole 59.

When the piston is moved toward the left poppet 48 seats and the liquid to the left of the piston is compressed. This compressed liquid unseats poppet 40 and then passes through piston 37. Since the piston rod 36 displaces part of the liquid passing through the piston 37 it forces liquid out of the outlet 59. Thus the pump is double acting.

It will be noted that the poppets 40 and 48 closely fit the cylindrical holes in which they are placed. This insures the seating of the poppets on one surface only, as compared to a ball poppet which may present a different line of contact every time it seats. The fluid passes past the poppet 48 by flowing along the flat sides thereof. This flow action may be increased by scalloping the poppet between its guiding corners or by forming holes in the poppet. Although not clearly shown, the poppets 40 and 48 have a differential angle relative to their respective seats.

Figure 6:
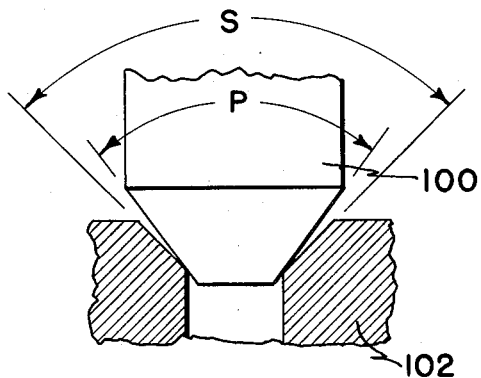
Figure 6 is a view in elevation of a poppet and a seat in section, both made in accordance with a preferred form of the invention.
Figure 7:
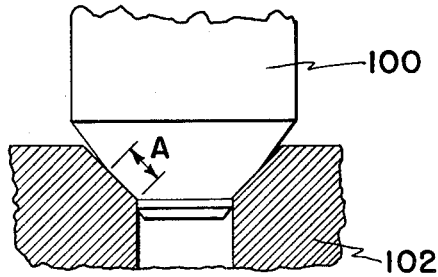
Figure 7 is a view in elevation of the popet and seat of Figure 6 after the poppet has worn to form a contact surface.

The relative angles between the poppet and the valve seat are shown in Figures 6 and 7. A poppet 100 is seated on a valve seat 102. The poppet 100 may be made of any soft material such as an organic plastic, and the valve seat 102 is made of a harder material such as duralumin or some other metal.

The included angle of the poppet is designated as the angle P and the included angle of the seat is indicated by the angle S. When the poppet 100 is first placed on the seat 102, there is a line contact between the seat and the poppet. However, after wear due to operation, the softer poppet material 100 is worn away causing the poppet to contact the seat over an annular area of width A, as shown in Figure 7. Ordinarily the most easily replaceable element is made of easily wearing material, and in some types of construction it may be desirable to have the seat wear and the poppet remain untouched.

The exact differential angle between the angles P and S is determined by the effective pressure against which the poppet 100 seals, and also by the relative wear characteristics between the poppet 100 and the seat 102. For a given combination of materials the differential angle between the seat and the poppet does not vary according to the angle P of the poppet, and the angle P may approach 180° or approach 0° without materially affecting the differential angle. If an easily worn material were used, for example chalk, for the material of the poppet, the differential angle would approach 0°. This is because an annular seat will be readily worn into the poppet by the harder seat material.

Figure 8:
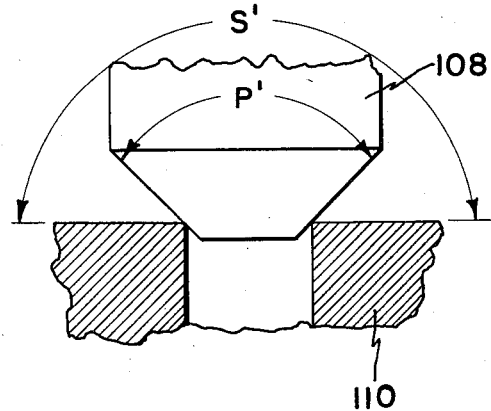
Figure 8 is a view in elevation of a poppet and seat having the greatest practical differential angle between the seat surface and the poppet surface.
Figure 9:
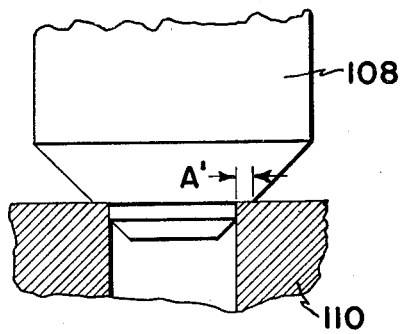
Figure 9 is a view in elevation of the poppet and seat of Figure 8 after the poppet has worn.

If pressures are very low the differential angle is increased. An illustration of this is shown in Figures 8 and 9 where a relatively soft poppet 108 is seated on a harder seat 110. The differential angle between the poppet angle P' and the seat angle S' is very close to 90°. Under these conditions the poppet is worn more rapidly than a poppet of a flatter angle at the same pressure, and a seat of width A' is worn into the poppet as shown in Figure 9. The width of the seat at relatively low pressures may be relatively narrower than at higher pressures because there is less leakage at lower pressures.

The material from which the poppets may be made is preferably a non-metallic material because of the wear characteristics of most metals. As shown in Figures 7 and 9 the poppet must wear to provide the necessary seat contact. If the seat is made of metal and the poppet is made of a non-metallic substance, the rate of wear between the two seems to depend roughly upon the hardness of the two substances. This is in contrast to metal to metal contact where wear does not seem to be a function of relative hardness. I have found that when a poppet made of Bakelite having a Brinell hardness of 30 is used in combination with a duralumin seat having a Brinell hardness of 100 that satisfactory wear characteristics result. The ratio of hardness will vary according to the materials used to gain the appropriate wear characteristics, and the above figures apply only to Bakelite.

The material from which the poppet is made must be non-malleable in operation. If a malleable material such as a metal were used such as lead, it would pound out of shape rather than wear regularly such as a non-malleable material wears. For this reason various plastics are undesirable including the vinyl base plastics and the cellulose acetate base plastics. Rubber-like materials have also proved to be unsatisfactory because they deform elastically rather than wear to the close finish required for precision valve work. In this connection also Bakelite has been found to be substantially non-malleable and to wear regularly without appreciable malleable deformation.

The material for the plastic must also be free from cold flow characteristics. In this connection cellulose acetate plastics are also undesirable in that they deform permanently under the influence of pressure. Again Bakelite is a material which has proved its freedom from cold flow under all practical operating conditions.

As previously stated, a phenolic condensation product such as Bakelite has been found to be a very satisfactory material for poppets. The Bakelite should preferably be of a fine linen base to give it the requisite strength and wear characteristics. A paper base Bakelite has been found to be too brittle for normal machine shop handling and for valve use, and undesirable chipping has resulted. Any other non-metallic substance or organic plastic substance having similar physical characteristics is desirable as a poppet material. With extremely low pressures a much softer material than Bakelite may be used, and for pressure in excess of 1500 pounds per square inch a harder material may also be desirable.

In actual practice it has been found that the rate of wear is so slow and so even on Bakelite that a highly polished valve seat contact area has resulted. This area is never a static one, but is constantly changing due to wear, and for this reason will always fit the seat upon which it rests regardless of the condition of the seat due to wear. The harder the usage the greater the wear and consequently there is never any difference of sealing dependent on this usage. The sealing qualities may be improved on poor seats by restraining the poppet from rotating about its longitudinal axis.

There has been some slight indication that permanent deformation of the poppet of a compression character results in the contact area, as well as wear. This deformation, if there be any, is so slight, however, that it is not visually apparent, and the poppet may still be accurately referred to as "non-malleable." Thus whenever I refer to my poppets as being non-malleable, I mean poppets whose permanent deformation during operation is not readily apparent or is not appreciable from an operating standpoint.

Although this invention has been described with reference to certain particular embodiments thereof it is not limited to these embodiments nor otherwise except by terms of the following claim.

I claim:

A poppet valve for controlling fluid flow comprising cooperating seat and poppet elements, the seat element being of metallic material and the poppet element being of an organic plastic product free from appreciable cold flow and having a wear characteristic greater than the valve seat, said elements having coacting conical surfaces and the included angle of the seat element being greater than the included angle of the poppet element whereby initial contact between said poppet and seat is substantially a line at the small end of the seat and the unit pressure between the contacting areas of the elements during initial closing and opening movements is relatively very great, causing initial rapid wear of the poppet to produce thereon a sealing band of appreciable area sealing with a corresponding band extending outwardly from the small end of the seat, said poppet material being of such characteristics as to wear rapidly and smoothly at the unit pressures existing at the initial line contact and to wear extremely slowly at the unit pressures resulting when the contact area has become a band of appreciable width less than the total width of the conical seat.

WALTER C. TRAUTMAN.